(12) United States Patent
Park et al.

(10) Patent No.: US 7,499,383 B2
(45) Date of Patent: Mar. 3, 2009

(54) WRITE-ONCE OPTICAL DISC AND METHOD FOR MANAGING SPARE AREA THEREOF

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 1084 days.

(21) Appl. No.: 10/781,828

(22) Filed: Feb. 20, 2004

(65) Prior Publication Data

US 2004/0165495 A1    Aug. 26, 2004

(30) Foreign Application Priority Data

Feb. 21, 2003 (KR) .................. 10-2003-0010924
Sep. 19, 2003 (KR) .................. 10-2003-0065204

(51) Int. Cl.
*G11B 7/00* (2006.01)

(52) U.S. Cl. ............... 369/47.14; 369/53.17; 369/53.15

(58) Field of Classification Search ............... None
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,442,611 A | 8/1995 | Hosaka et al. |
| 5,448,728 A | 9/1995 | Takano et al. |

(Continued)

FOREIGN PATENT DOCUMENTS

CN    1134017 A    10/1996

(Continued)

OTHER PUBLICATIONS

JIS handbook data processing for hardware, Japan, Japanese Standards Association Inc., Apr. 21, 1999, pp. 1064-1070.

*Primary Examiner*—Wayne R Young
*Assistant Examiner*—Van N Chow
(74) *Attorney, Agent, or Firm*—Birch, Stewart, Kolasch & Birch, LLP

(57) ABSTRACT

Disclosed is a write-once optical disc and method for managing a spare area thereof, the write-once optical disc possibly having a temporary defect management area within one or more spare areas. The method includes the steps of: allocating one or more spare areas including the temporary defect management area at an initial status of the optical disc; and during use of the optical disc, expanding the spare area allocated including the temporary defect management area to set a new spare area. By employing the above optical disc and method, it becomes possible to establish unified regulations on the structures of the spare area and temporary defect management area applicable to the write-once optical disc, so that usage efficiency of the optical disc can be improved.

12 Claims, 15 Drawing Sheets

- TDMA : Temporary DMA
- PTDMA : Primary TDMA
- ATDMA : Additional TDMA

U.S. PATENT DOCUMENTS

| | | | |
|---|---|---|---|
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,878,020 A | 3/1999 | Takahashi |
| 5,914,928 A * | 6/1999 | Takahashi ................. 369/47.14 |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 * | 4/2002 | Takahashi ................. 369/53.15 |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 * | 11/2002 | Park et al. ................. 369/59.25 |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 * | 9/2004 | Park et al. ................. 369/53.15 |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 * | 10/2006 | Ueda et al. ................. 369/47.14 |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 * | 12/2007 | Hwang et al. ............ 369/53.17 |
| 7,327,654 B2 | 2/2008 | Hwang et al. |
| 7,349,301 B2 | 3/2008 | Terada et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |

| | | | |
|---|---|---|---|
| 2005/0195716 A1 | 9/2005 | Ko et al. | |
| 2005/0207262 A1 | 9/2005 | Terada et al. | |
| 2005/0289389 A1 | 12/2005 | Yamagami et al. | |
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |
| CN | 1675708 A | 9/2005 |
| CN | 1685426 A | 10/2005 |
| DE | 199 54 054 A1 | 6/2000 |
| EP | 0314186 A2 | 5/1989 |
| EP | 0325823 A1 | 8/1989 |
| EP | 0350920 A2 | 1/1990 |
| EP | 0464811 A2 | 1/1992 |
| EP | 0472484 A2 | 2/1992 |
| EP | 0477503 A2 | 4/1992 |
| EP | 0556046 A1 | 8/1993 |
| EP | 0871172 A2 | 10/1998 |
| EP | 0908882 A2 | 4/1999 |
| EP | 0974967 A1 | 1/2000 |
| EP | 0989554 A1 | 3/2000 |
| EP | 0997904 A1 | 5/2000 |
| EP | 1026681 B1 | 8/2000 |
| EP | 1043723 A1 | 10/2000 |
| EP | 1132914 A2 | 9/2001 |
| EP | 1148493 A2 | 10/2001 |
| EP | 1152414 A2 | 11/2001 |
| EP | 1239478 A1 | 9/2002 |
| EP | 1274081 A2 | 1/2003 |
| EP | 1612790 A1 | 1/2003 |
| EP | 1298659 A1 | 4/2003 |
| EP | 1329888 A1 | 7/2003 |
| EP | 1347452 A2 | 9/2003 |
| EP | 1547065 | 6/2005 |
| EP | 1564740 A1 | 8/2005 |
| EP | 1573723 | 9/2005 |
| EP | 1623422 | 2/2006 |
| GB | 2356735 A | 5/2004 |
| JP | 63-091842 A | 4/1988 |
| JP | 01-263955 A | 10/1989 |
| JP | 02-023417 A | 1/1990 |
| JP | 05-274814 A | 10/1993 |
| JP | 06-349201 A | 12/1994 |
| JP | 08-096522 A | 4/1996 |
| JP | 09-145634 A | 6/1997 |
| JP | 09-231053 A | 9/1997 |
| JP | 10-050005 A | 2/1998 |
| JP | 10-050032 A | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 A1 | 7/1998 |
| JP | 11-110888 A | 4/1999 |
| JP | 11-203792 A | 7/1999 |
| JP | 2000-090588 A | 3/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2001-023317 A | 1/2001 |
| JP | 2001-069440 A | 3/2001 |
| JP | 2001-110168 A | 4/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-056619 A | 2/2002 |
| JP | 2002-215612 A | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-536194 A | 12/2003 |
| JP | 2004-280864 A | 10/2004 |
| JP | 2004-280865 A | 10/2004 |
| JP | 2005-004912 A | 6/2005 |
| JP | 2005-535993 A | 11/2005 |
| JP | 2005-538490 A | 12/2005 |
| JP | 2005-538491 A | 12/2005 |
| JP | 2006-519445 A | 8/2006 |
| KR | 1020040094301 A | 11/2004 |
| RU | 2005 103 626 | 9/2005 |
| RU | 2005 127 337 | 2/2006 |
| TW | 371752 | 10/1999 |
| TW | 413805 | 12/2000 |
| WO | WO-84/00628 A1 | 2/1984 |
| WO | WO-96/30902 A1 | 10/1996 |
| WO | WO-97/22182 A1 | 6/1997 |
| WO | WO-00/54274 A1 | 9/2000 |
| WO | WO-01/22416 A1 | 3/2001 |
| WO | WO-01/93035 A2 | 12/2001 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/025648 | 3/2004 |
| WO | WO-2004/025649 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004/015180 A1 | 9/2004 |
| WO | WO-2004-075180 | 9/2004 |
| WO | WO-2004/079631 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |

\* cited by examiner

BD-WO Single Layer

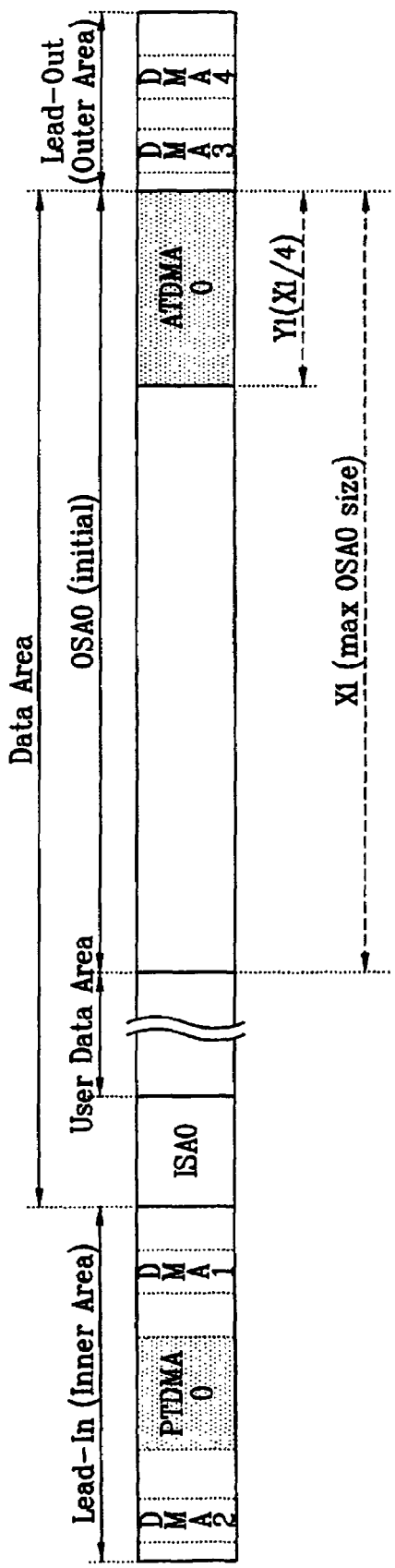

BD-WO Single Layer

BD-WO Single Layer

US 7,499,383 B2

WRITE-ONCE OPTICAL DISC AND METHOD FOR MANAGING SPARE AREA THEREOF

This Nonprovisional application claims priority under 35 U.S.C. § 119(a) on Patent Application No(s). P-2003-10924 and P-2003-65204 filed in KOREA on Feb. 21, 2003 and Sep. 19, 2003, the entire contents of which are hereby incorporated by reference.

This application claims the benefit of the Korean Application Nos. 10-2003-0010924 filed on Feb. 21, 2003, and 10-2003-0065204 filed on Sep. 19, 2003 which are hereby incorporated by reference.

BACKGROUND OF THE INVENTION

1. Field of the Invention

The present invention relates to a write-once optical disc and a method for managing spare area thereof, and more particularly, to a method for allocating a spare area to reduce or expand the allocated spare area.

2. Discussion of the Related Art

As optical recording mediums, optical discs having a large capacity of data recorded thereon are widely being used. Among them, a new high-density digital versatile disc (HD-DVD), for instance, a blu ray disc (Blu-ray Disc) that can record and store video data of high quality and audio data of high fidelity for a long term period has been recently developed.

The blu-ray disc employing a next-generation HD-DVD technology is a next-generation optical recording solution that can store data to such a degree remarkably exceeding the storage capacity of a conventional DVD, and a technical specification of international standard for HD-DVD has been recently regulated.

Related with this, various standards related with the blu-ray disc are prepared, and various standards for a write-once blu-ray disc (BD-WO) are being prepared following a rewritable blu-ray disc (BD-RE).

FIG. 1 schematically illustrates a structure of a recording area of a rewritable blu-ray disc (BD-RE). FIG. 1 illustrates, for example, a structure of a recording area of a single-layer disc having one recording layer. The disc is distinguished when viewed from the inner periphery thereof as a lead-in area, a data area and a lead-out. Further, the data area is provided with an inner spare area (ISA0) and an outer spare area (OSA0) respectively disposed at the inner and outer peripheries to replace a defective area. A user data area for recording user data therein is provided between the spare areas.

While data is recorded on the rewritable blue-ray disc (BD-RE), if there exists the defective area in the user data area, data recorded in the defective area is transferred to and replaced and recorded in the spare area. Additionally, position information related with the defective area, that is, position informations related with the defective area and a replacement area and the like is recorded in defect management areas (DMA 1, 2, 3, 4) provided for the lead-in/out areas to perform defect management. The BD has a cluster as a minimal recording unit recorded thereon. One cluster is comprised of total 32 sectors, and one sector is comprised of 2048 bytes.

Since rewriting can be performed even in any area of the rewritable disc, an entire area of the disc can be used randomly irrespectively of a specific recording manner. Also, since the defect management information can be rewritten even in the defect management area (DMA), it does not matter even though only a predetermined size of the defect management area is provided. In particular, the BD-RE allocates and uses 32 clusters as the defect management area (DMA).

However, in the write-once disc, since writing can be made once on the disc, the recording manner is not only much limited, but also the defect management becomes one of important matters when data is recorded on a high-density write-once disc such as the recent BD-WO. Accordingly, even the write-once disc needs a management area to record information on defect management and disc management, and especially the write-once optical disc needs a larger management information recording area with comparison to the rewritable disc due to the property of 'write-once'. Like the rewritable optical disc, the write-once optical disc also needs a larger spare area than the rewritable optical disc so as to enable the defect management and the (logical) overwriting function.

However, since any of currently published regulations on the conventional write-once optical disc (ex. CD-R, DVD-R etc.) does not refer to a case where the spare area and the defect management area are both provided, preparation of new unified regulations is required for satisfying the above-mentioned requirements.

SUMMARY OF THE INVENTION

Accordingly, the present invention is directed to a write-once optical disc and a method for managing a spare area thereof that substantially obviate one or more problems due to limitations and disadvantages of the related art.

An object of the present invention is to provide a method for managing a spare area and a defect management area in a write-once optical disc, and a recording/reproducing apparatus related to the method, in particular, to provide a method for flexibly reducing or expanding the size of a spare area and/or a defect management area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for managing a spare area of a write-once optical disc possibly having a temporary defect management area within one or more spare areas, the method comprising the steps of: allocating one or more spare areas including the temporary defect management area at an initial status of the optical disc; and during use of the optical disc, expanding the spare area allocated including the temporary defect management area to set a new spare area.

In an aspect of the present invention, there is provided a method for managing a spare area of a write-once optical disc possibly having a temporary defect management area within one or more spare areas, the method comprising the steps of: allocating only the spare area not including the temporary defect management area at an initial status of the optical disc; and during use of the optical disc, additively allocating the spare area including the temporary defect management area.

In another aspect of the present invention, there is provided a method for managing a spare area of a write-once optical disc possibly having a temporary defect management area within one or more spare areas, the method comprising the steps of: allocating one or more spare areas including the temporary defect management area at an initial status of the optical disc; and during use of the optical disc, reducing an area except for the temporary defect management area in the spare area allocated including the temporary defect management area to set a new spare area.

In another aspect of the present invention, there is provided a method for managing a spare area of a write-once optical disc possibly having a temporary defect management area within one or more spare areas, the method comprising the steps of: allocating an expanded area discriminated from the spare area and a user data area; and during use of the optical disc, expanding the spare area and the user data area into the expanded area as necessary.

In another aspect of the present invention, there is provided a write-once optical disc provided with a lead-in area and a data area, at least one or more spare areas including a temporary defect management area being allocated in the data area, a new spare area being possibly set by expanding or reducing the spare area allocated including the temporary defect management area.

In another aspect of the present invention, there is provided a write-once optical disc provided with a lead-in area and a data area, the data area being provided therein with a spare area and a user data area, and further provided with a separate expanded area such that the spare area or the user data area is expandable as necessary.

In another aspect of the present invention, there is provided an optical record reproducing apparatus of a write-once optical disc comprising: a control part for determining whether or not a spare area is additively allocated; and a recording/reproducing part for expanding a spare area including a temporary defect management area when it is necessary to additively allot the spare area depending on the determination, and setting a new spare area.

In another aspect of the present invention, there is provided an optical record reproducing apparatus of a write-once optical disc comprising: a control part for determining whether or not an allocated spare area is reduced; and a recording/reproducing part for reducing a spare area including a temporary defect management area when it is necessary to reduce the spare area depending on the determination, and setting a new spare area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A and 5B illustrate a method for managing spare area according to a second embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

For description convenience, a write-once optical disc is exemplified with a blu-ray disc (BD-WO).

Together with this, the terminology of the present invention employs generally popularized terms if possible. However, in a specific case, terms are arbitrarily selected by the inventor. In this case, since meanings of the terms are defined in detail in corresponding descriptions, it is understood that the invention should be understood with the meanings of the terms, not simple names of the terms.

Figure 1:
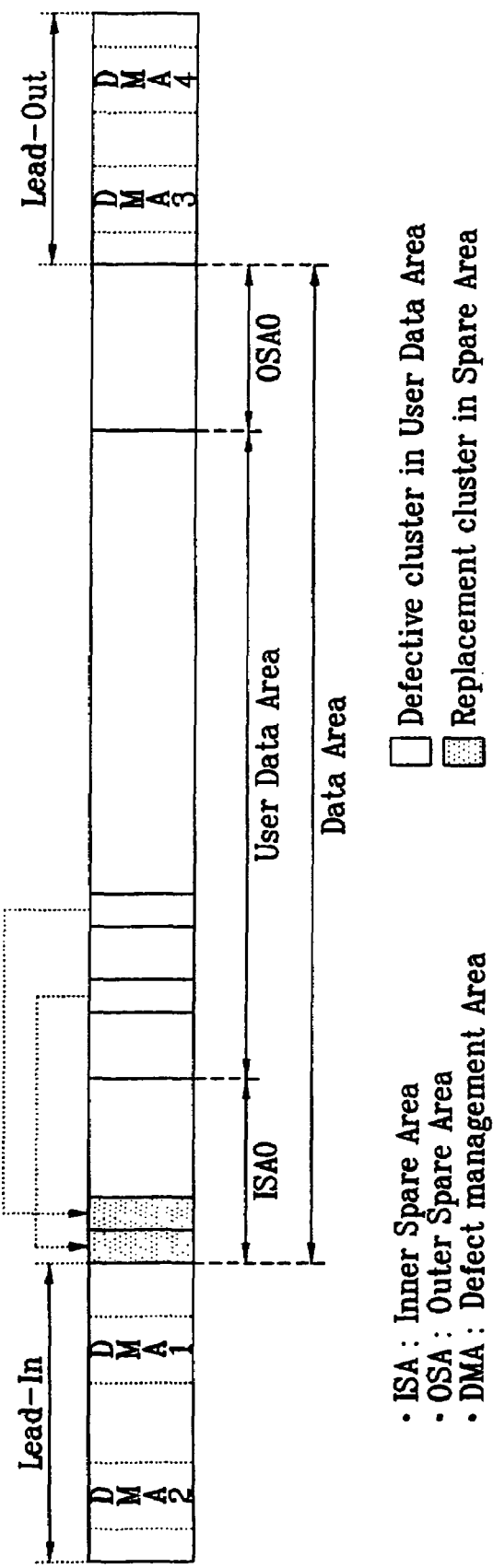
FIG. 1 schematically illustrates a conventional rewritable optical disc structure.
Figure 2:
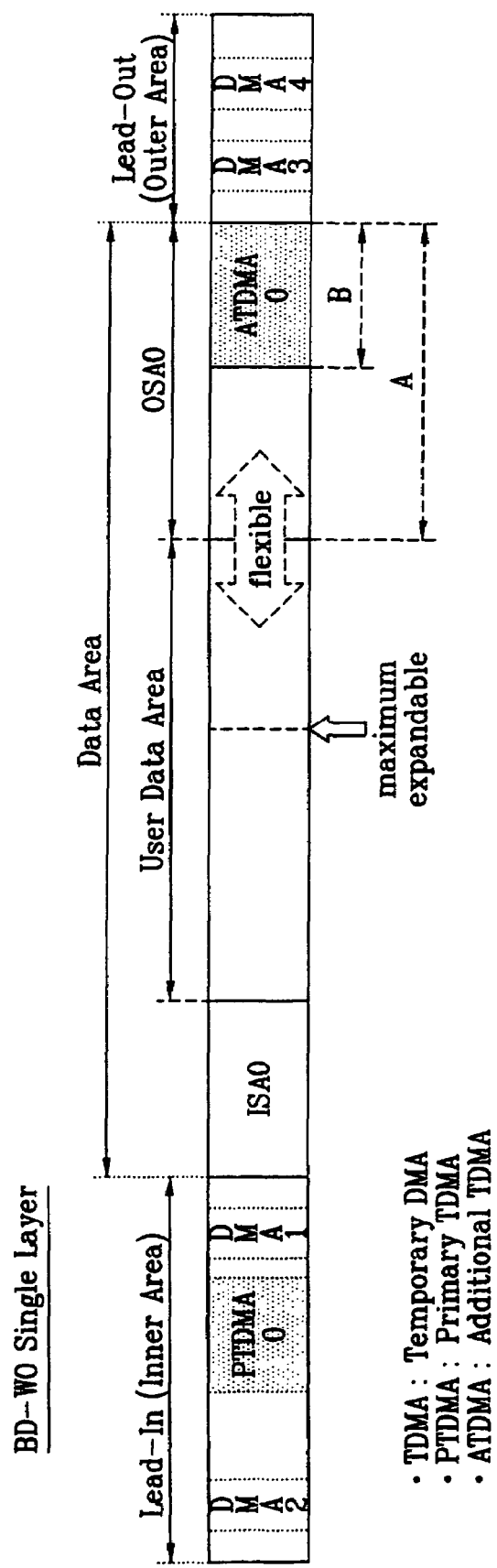
FIG. 2 illustrates a single layer structure of an write-once optical disc according to the present invention.
Figure 3:
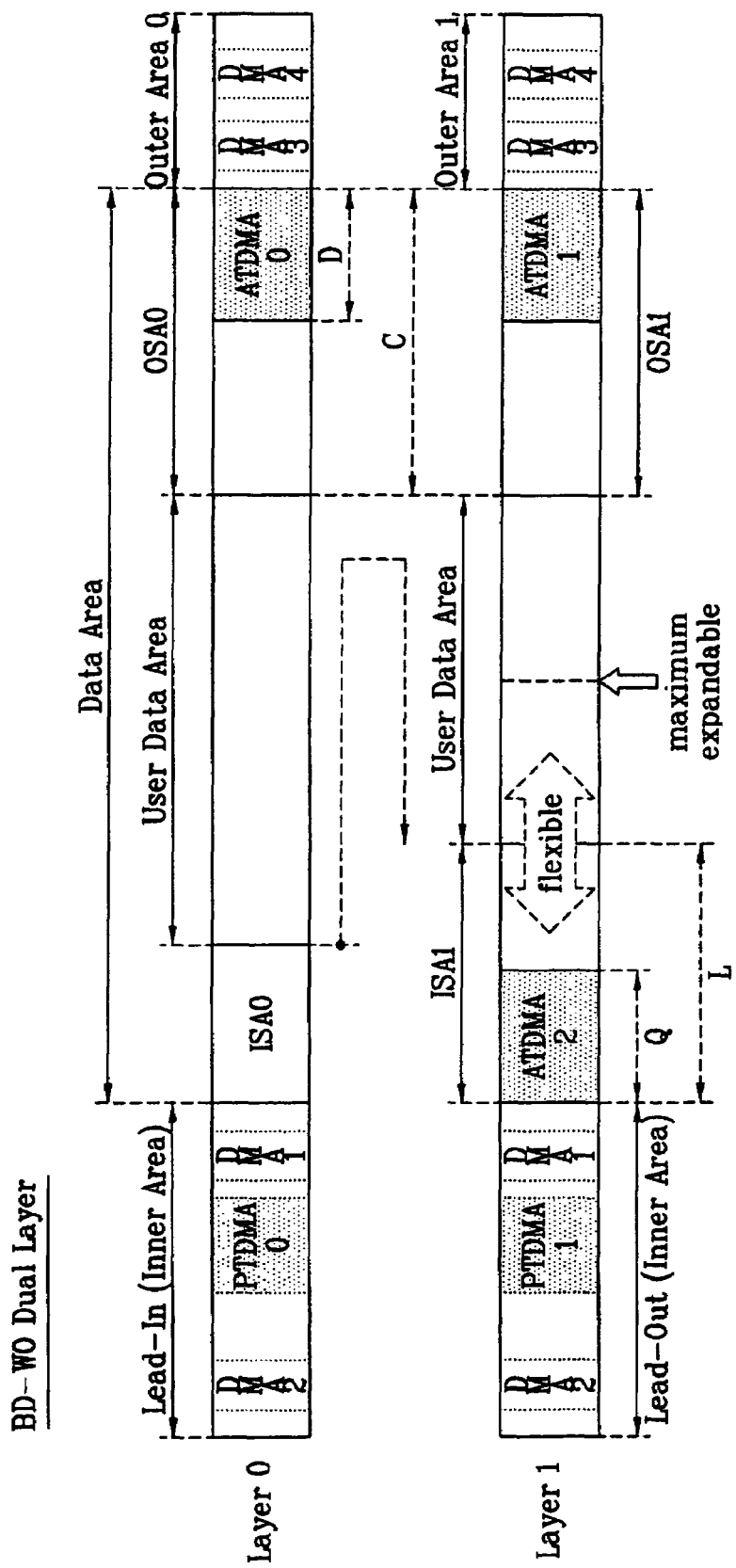
FIG. 3 illustrates a dual layer structure of an write-once optical disc according to the present invention.

FIGS. 2 and 3 concretely illustrate structures of write-once optical discs according to the present invention.

The inventive write-once optical disc is characterized by including a spare area and a temporary disc management area (TDMA) for defect management. Hereinafter, there will be in detail described a method how to allocate the spare area and the defect management area within the optical disc.

FIG. 2 illustrates a structure of a write-once optical disc (BD-WO), i.e., a single layer disc having one recording layer, and has the following two characteristics compared with the conventional rewritable optical disc (BD-RE).

First, since the write-once optical disc by nature has to secure many areas on which a variety of management information of the disc are recorded, it includes a plurality of Temporary Defect Management Areas (hereinafter, referred to as "TDMA") as well as the conventional Defect Management Area (hereinafter, referred to as "DMA"). In particular, TDMAs are generally classified into two types: primary TDMA (hereinafter, referred to as "PTDMA") having a fixed size (for example, 2048 clusters) within the lead-in area; and additional TDMA (referred to as "ATDMA") having a variable size within the outer spare area (OSA0) among the spare areas of the data area. They are respectively named as the PTDMA0 and the ATDMA0.

The PTDMA0 should be inevitably allocated to the lead-in area at the fixed size (for example, 2048 clusters) at an initial status of the disc, and the ATDMA0 can be selectively allocated or not allocated. In the course of allocating, the size (B) of the ATDMA0 can be determined variously, and would be appropriate when having a specific-rated size (for example, B=A/4) with respect to the size (A) of the spare area (OSA0). That is, the inventive write-once optical disc includes a plurality of the temporary defect management areas (TDMAs) in addition to the defect management area (DMA). The TDMAs are characterized by including the PTDMA allocated in the fixed size and the ATDMA allocated to a specific spare area in the variable size.

Second, the size of the spare area is set flexibly. In other words, the flexible setting of the size of the spare area is meant by that it is possible to expand or reduce the size of an initially allocated spare area. This is because many spare areas are necessary so as for the write-once optical disc to perform the defect management and enable to perform an additional function (for instance, relates to a logic overwriting in BD-WO, in case of BD-WO, it is impossible to physically rewrite information on a specific area but when it is wished to rewrite information on a specific area where recording has been completed, the area is replaced by a spare area and recorded).

Also, to prevent disorder that may be caused when all the spare areas are utilized flexibly, it is allowed to make only the spare area existing in the end portion of the user data area flexible. The spare area existing in the end portion of the user data area corresponds to outer spare area (OSA0) when the single layer disc as shown in FIG. 2 is employed, and corresponds to inner spare area (ISA1) of the second recording layer (Layer1) when the dual layer disc as shown in FIG. 3 is employed. In other words, the spare area, which is flexibly used in the entire areas of the disc, exists only one, and the remaining spare area is fixed to an initially allocated size, later expanded, or reduced to a flexible size.

In addition, the spare area is expandable to a predetermined maximum expandable size to thereby prevent the spare are from being expanded endlessly. For instance, if it is assumed that a preferable maximum expandable size of the spare area is up to the half of the entire data areas, the maximum expandable size of the spare area in the single layer as shown in FIG. 2 becomes about 12 GB (768×256 clusters). However, it is apparent that the maximum expandable size can be set to another size in regulating standards.

Further, for the convenience of description, it is made clear that alphabets (A, B, C, D, N, P, L, Q, X, Y, Z, K and the like) representing the respective areas of the disc are marked as information indicating sizes of corresponding areas.

FIG. 3 illustrates a dual layer structure having two recording layers in a write-once optical disc according to the present invention. The dual layer structure includes a first recording layer (Layer0) and a second recording layer (Layer1). Each of the first and second recording layers includes PTDMA0 (Layer0) and PTDMA1 (Layer1) having a fixed size. In the dual layer structure, total four spare areas are allocatable, and specifically, ISA0 and OSA0 are respectively allocated in inner periphery and outer periphery of the first recording layer (Layer0) while ISA1 and OSA1 are respectively allocated in inner periphery and outer periphery of the second recording layer (Layer1). Especially, ATDMAs exist only within OSA0/OSA1/ISA1 among these areas, and are respectively named ATDMA0/ATDMA1/ATDMA2. Also, as described in FIG. 2, the spare area that is used flexibly corresponds only to the inner spare area (ISA1) of the second recording layer existing in an end of user data area, and is allowed to be expandable to maximum expandable size, thereby preventing the flexibly used spare area from being expanded endlessly. In FIG. 3, alphabets C, D, L, Q correspond to size information of corresponding areas. Especially, it is desirable that the size (D) of ATDMA0 and ATDMA1 has a size corresponding to about a quarter of the size (C) of OSA0 and OSA1. Also, it is desirable that the size (Q) of ATDMA2 has a size corresponding to about a quarter of the size (L) of ISA1. These sizes are however items that should be determined by standards, and it is obvious that these sizes may be changed.

Hereinafter, a method for flexibly allocating spare areas including a temporary defect management area according to the present invention will be described through various embodiments referring FIGS. 4 to 7.

Also, although the following embodiments exemplarily illustrate only the single layer structure as in FIG. 2 for the convenience of description, it will be apparent that the dual layer structure shown in FIG. 3 can be also applied. In case of the dual layer structure, ISA1 not OSA1 is flexibly used as described previously.

Figure 4A:
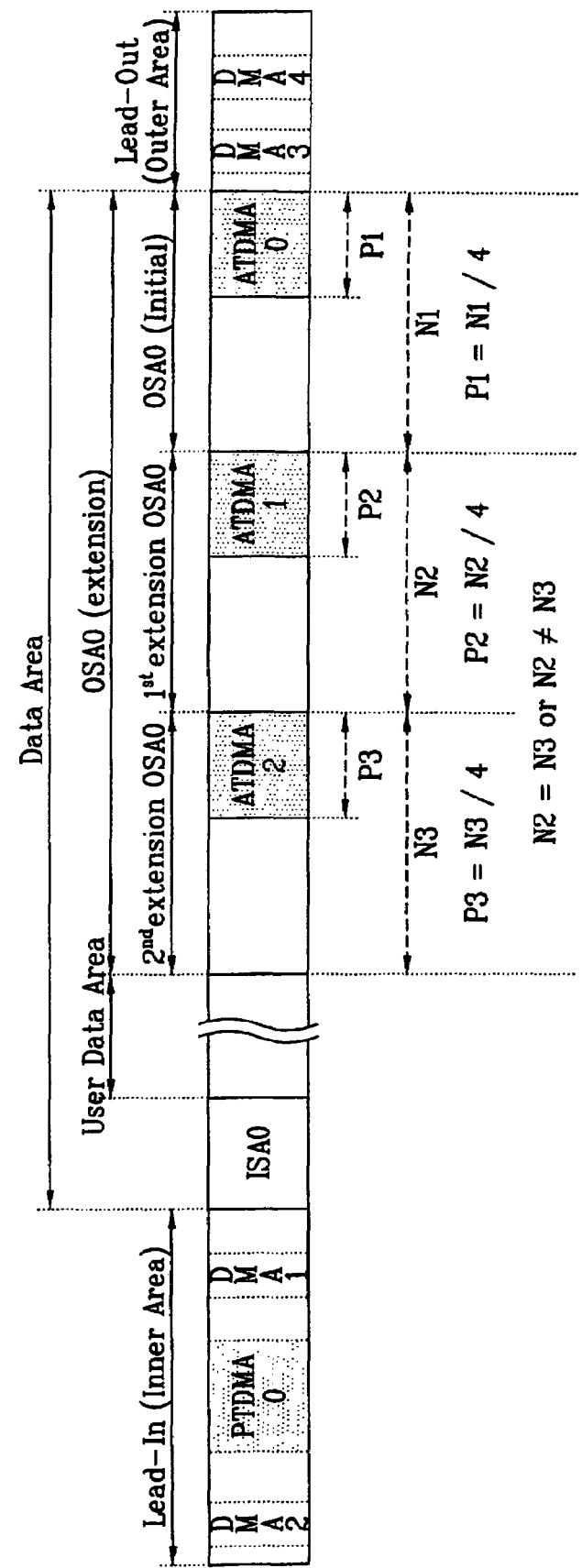
FIGS. 4A to 4C illustrate a method for managing spare area according to a first embodiment of the present invention.
Figure 4B:
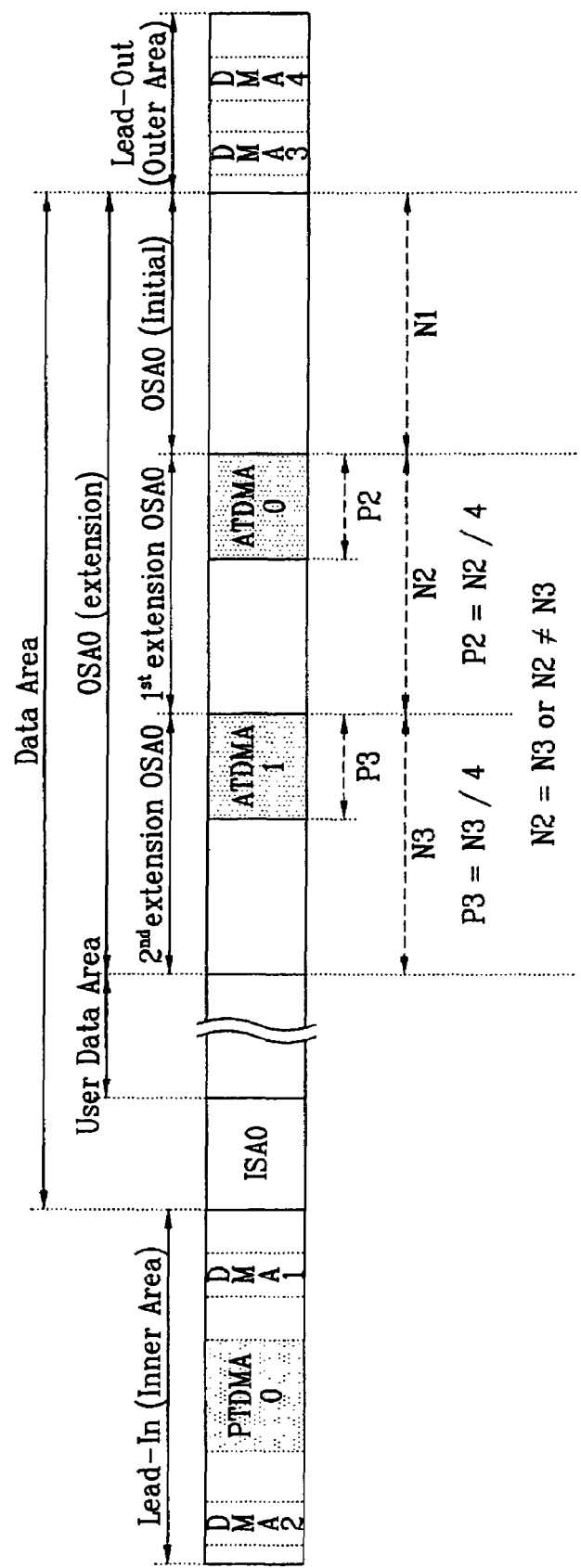
Figure 4C:
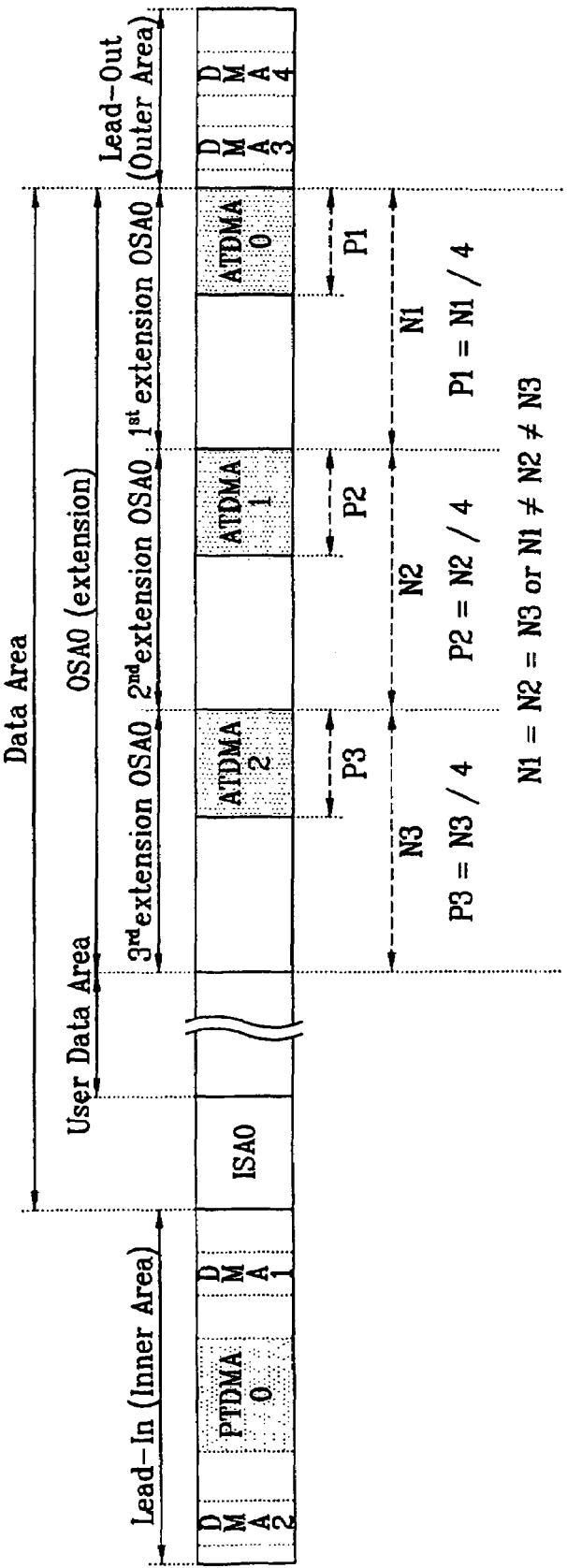

FIGS. 4A to 4C illustrate a method for managing spare area according to a first embodiment of the present invention. In this method, whenever the spare area is expanded, ATDMA is allocated too. In other words, FIGS. 4A to 4D show that whenever the OSA0 is expanded, ATDMA contained in the expanded OSA0 is allocated together with the OSA0.

First, in FIG. 4A, OSA0 (initial) including ATDMA0 is allocated at an initial status such that the ATDMA0 has a size (P1) corresponding to a quarter of an overall size (N1) of OSA0. The term 'initial' means a state before an initial recording of a user is carried out. Accordingly, the allocation of the initial OSA0 as above may be performed by a disc manufacturer or by a user. In other words, the user may format the disc to initialize the allocation of the OSA0.

After the above initial state, when it is necessary to expand the spare area while the disc is used, an additional allocation may be possible by a command of a control part (see numeral 20 of FIG. 8) of a recording/reproducing apparatus or a command of a user, so that the entire spare area can be expanded.

Again referring to FIG. 4A, in a first extension, OSA0 is made to a size of N2 and ATDMAS1 (which is apparently different than ATDMA1 existing in the dual layer of FIG. 3) is made to a size of P2 such that the size of P2 corresponds to a quarter of the size of N2. Likewise, in a second extension, OSA0 is made to a size of N3 and ATDMAS2 is made to a size of P3 such that the size of P3 corresponds to a quarter of the size of N3.

In the above allocation method, the size (N2) of the first extension-allocated OSA0 and the size (N3) of the second extension-allocated OSA0 can be made flexible, i.e., different from each other or identical (N2=N3) to each other within the maximum expandable size.

FIG. 4B illustrates a case that OSA0 (initial) is allocated at an initial status but ATDMA0 is not allocated within OSA0 (initial). In other words, sine ATDMA can be allocated selectively within OSA0 or be not allocated, it is possible that OSA0 (initial) no having ATDMA is allocated at the initial status as shown in FIG. 4B.

After the above initial status, i.e., when it is necessary to expand the spare area while the disc is used, OSA0 including ATDMA will be allocated as in FIG. 4A.

In other words, in FIG. 4B, in a first extension, OSA0 is made to a size of N2 and ATDMAS0 is made to a size of P2 such that the size of P2 corresponds to a quarter of the size of N2. Likewise, in a second extension, OSA0 is made to a size of N3 and ATDMAS2 is made to a size of P3 such that the size of P3 corresponds to a quarter of the size of N3.

In the above allocation method, the size (N2) of the first extension-allocated OSA0 and the size (N3) of the second extension-allocated OSA0 can be made flexible, i.e., different from each other or identical (N2=N3) to each other within the maximum expandable size.

FIG. 4C illustrates a case that OSA0 is not allocated at an initial status. If OSA0 is not allocated at the initial status, the disc performs defect management only using ISA0 at the initial status and then allocates OSA0 to an outer periphery when spare area is additionally needed.

After the above initial status, i.e., when it is necessary to expand the spare area while the disc is used, OSA0 including ATDMA will be allocated as in FIGS. 4A and 4B.

In other words, in FIG. 4C, in a first extension, OSA0 is made to a size of N1 and ATDMAS0 is made to a size of P1 such that the size of P1 corresponds to a quarter of the size of N1. Likewise, in a second extension, OSA0 is made to a size of N2 and ATDMAS1 is made to a size of P2 such that the size of P2 corresponds to a quarter of the size of N2. Also, in a third extension, OSA0 is made to a size of N3 and ATDMAS2 is made to a size of P3 such that the size of P3 corresponds to a quarter of the size of N3.

In the above allocation method, the size (N1) of the first extension-allocated OSA0, the size (N2) of the second extension-allocated OSA0 and the size (N3) of the third extension-allocated OSA0 can be made flexible, i.e., different from one another or identical (N1=N2=N3) to one another within the maximum expandable size.

Figure 5B:
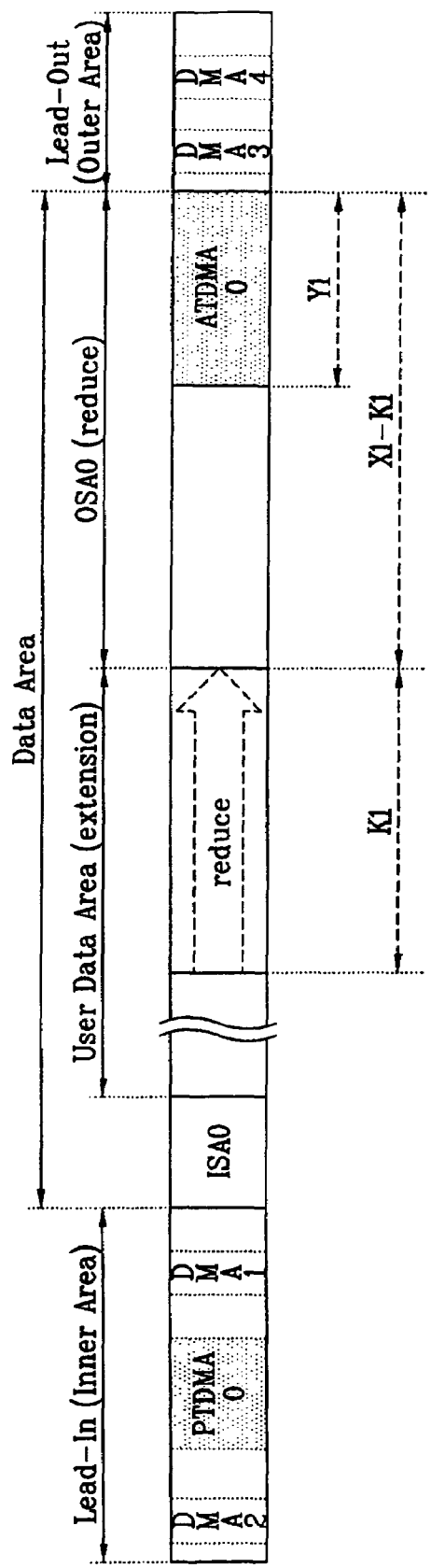

FIGS. 5A and 5B illustrate a method for managing spare area according to a second embodiment of the present invention.

In this second embodiment, OSA0 (initial) is allocated to a maximum expandable size that is allowable at an initial status by a disc, together with ATDMA0. Afterwards, if necessary, OSA0 (initial) is reduced. In this case, OSA0 is reduced only at a remaining area except for ATDMA0, but ATDMA0 is not altered from an initially allocated size. The size (Y1) of ATDMA0 is set at the initial status to be a quarter of the size (X1) of OSA0 (initial). Accordingly, the size (Y1) of ATDMA0 is like to be a much larger value than the size (P1) of ATDMA0 in the first embodiment. In other words, at the initial status of the disc, a sufficiently large ATDMA0 (Y1) is allocated and then the size of the ATDMA0 is not changed.

FIG. 5B illustrates that OSA0 (initial) is reduced during use of a disc when its reduction is necessary after the initial status. If OSA0 is reduced, an adjacent user data area is expanded but the size (Y1) of ATDMA0 is not changed.

In other words, the overall size (X2) of OSA0 is reduced to 'X1−K1' by the size (K1) of OSA0, but the size (Y1) of ATDMA0 is fixed, i.e., is not changed. However, the ratio of the size (Y1) of ATDMA0 to the size (X1) of OSA0 (initial) is changed from the ¼ relationship by the reduced allocation.

The above second embodiment has a burden that ATDMA0 and OSA0 (initial) having a large size are allocated at the initial status, but it has an advantage that it is convenient to manage ATDMA0 because the size of ATDMA0 is not changed and the additional allocation of ATDMA0 is not performed.

Figure 6A:
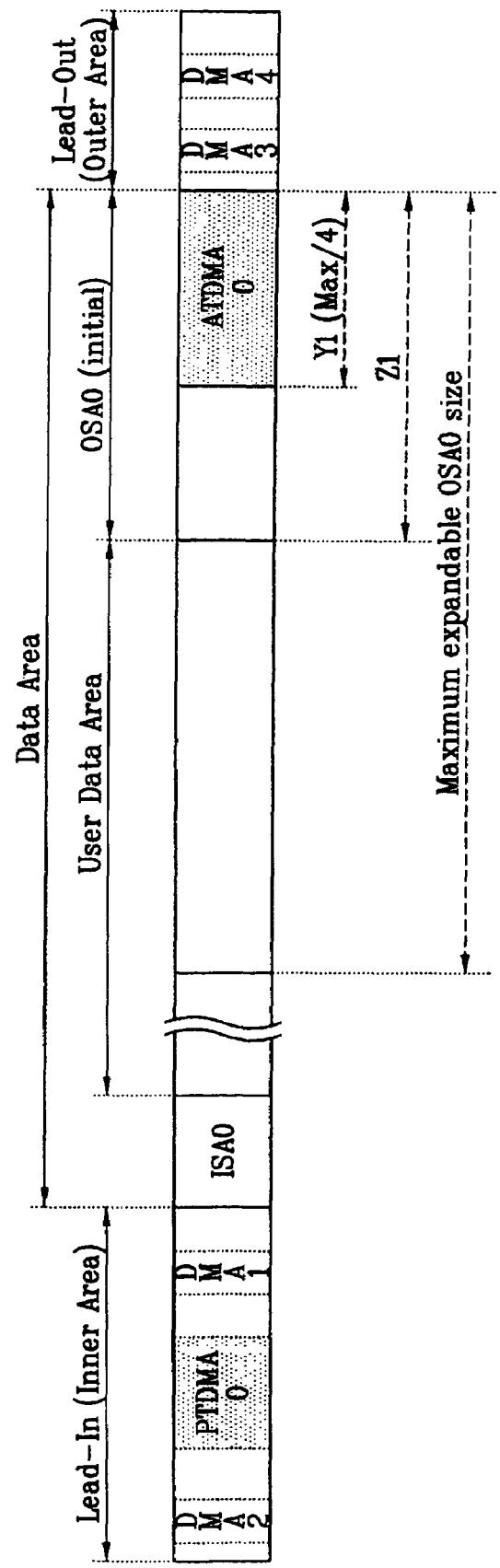
FIGS. 6A and 6B illustrate a method for managing spare area according to a third embodiment of the present invention.
Figure 6B:
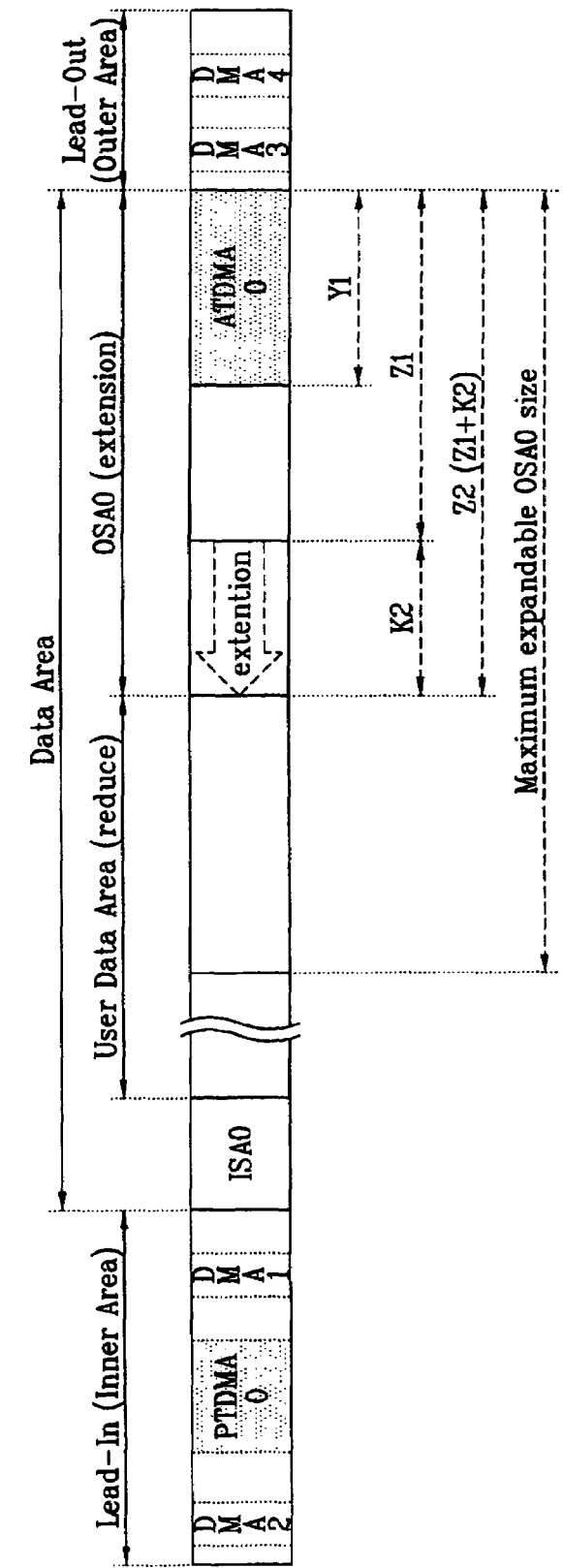

FIGS. 6A and 6B illustrate a method for managing spare area according to a third embodiment of the present invention.

In this third embodiment, OSA0 (initial) is allocated including ATDMA0 of which size is a quarter (max/4) of a maximum expandable size that is allowable by a disc. Afterwards, if necessary, OSA0 (initial) is expandable. In this case, OSA0 is expanded only at a remaining area except for ATDMA0, but ATDMA0 is not altered from an initially allocated size.

FIG. 6B illustrates that OSA0 (initial) is expanded during use of a disc when its extension is necessary after the initial status. If OSA0 is expanded, an adjacent user data area is reduced but the size (Y1) of ATDMA0 is not changed.

In other words, the overall size (Z2) of OSA0 is expanded to 'Z1+K2' by the size (K2) of OSA0, but the size (Y1) of ATDMA0 is fixed, i.e., is not changed. In other words, the ratio of the size (Y1) of ATDMA0 to the size (Z1) of OSA0 (initial) is not the ¼ relationship but if the OSA0 is expanded to the maximum expandable size, the size (Y1) of ATDMA0 will be changed at a ratio of ¼ size (max/4).

Like the second embodiment, the above third embodiment has a burden that ATDMA0 and OSA0 (initial) having a large size should be allocated at the initial status, but it has an advantage that it is convenient to manage ATDMA0 because the size of ATDMA0 is not changed and the additional allocation of ATDMA0 is not performed although OSA0 is expanded flexibly.

While in the second and third embodiments, cases that the size (Y1) of the initial ATDMA0 is a quarter of the maximum expandable size of OSA0 has been described, it will be apparent that a specific ratio other than the above ratio can be employed.

FIGS. 7A to 7D illustrate a method for managing a spare area according to a fourth embodiment of the present invention. In addition to a user data area and a spare area, an expandable area is further provided within the disc. If necessary, an expansion of the user data area or the spare area (except for ATDMA) or the ATDMA is allocated.

Figure 7A:
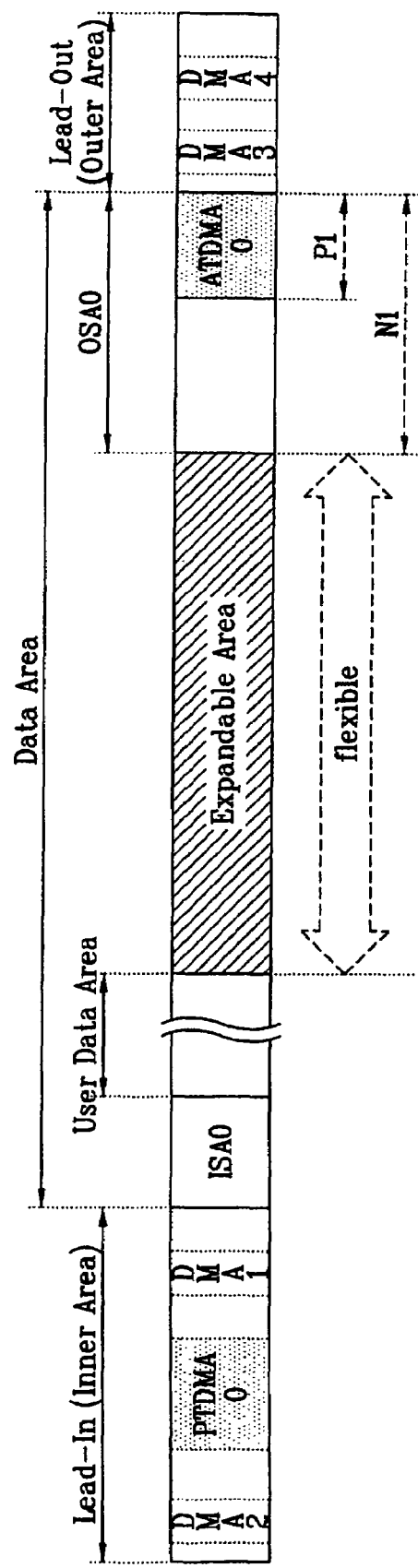
FIGS. 7A to 7D illustrate a method for managing spare area according to a fourth embodiment of the present invention.

FIG. 7A illustrates an initial status of an overall disc structure according to the fourth embodiment of the present invention. First, an initial OSA0 is allocated including an ATDMA0, and an expandable area is allocated between the user data area and the OSA0. As shown in FIG. 2 and as described in the above embodiment, it is good enough for the expandable area to have a maximum expandable size.

Figure 7B:
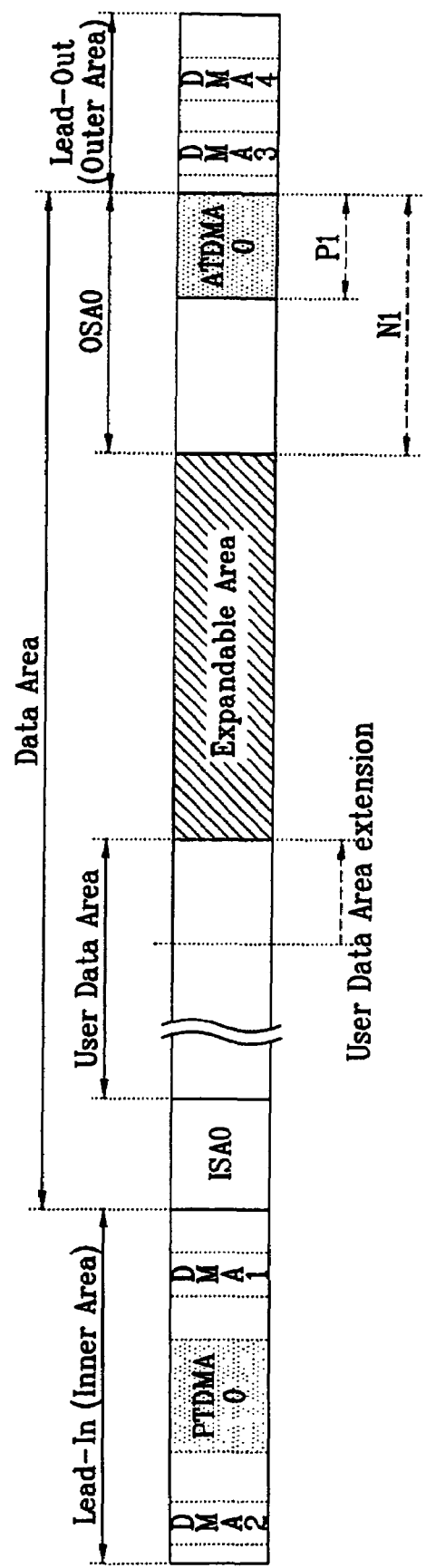

FIG. 7B illustrates a case that the user data area is expanded in the initial status. In other words, in case an additional allocation of the user data area is necessary, the user data area is allocated toward the expandable area as much as necessary. Of course, in this case, it does not matter that the user data area is always expanded with the equal size by formalizing the size to be allocated at a time. Since the user data area is expanded toward the inside of the expandable area, there is no change in the size of the OSA0.

Figure 7C:
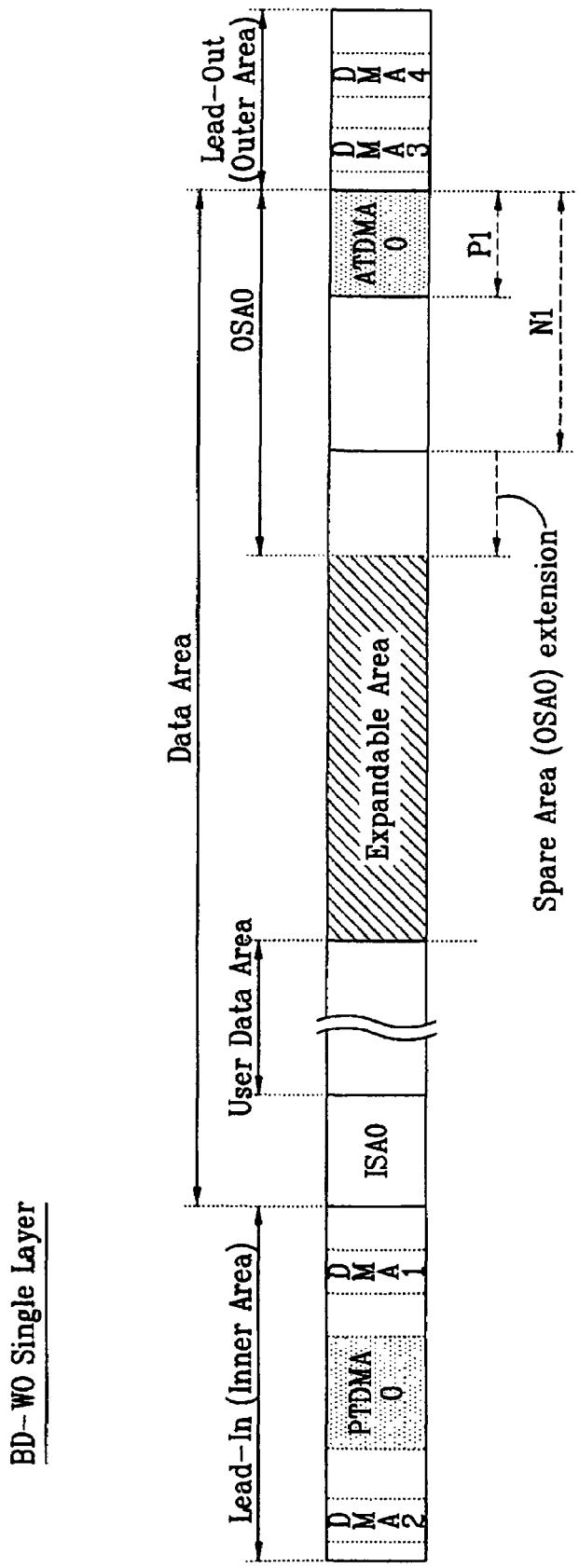

FIG. 7C illustrates a first case that the OSA0 is expanded in the initial status. Specifically, since the ATDMA0 is distinguished from the remaining area within the OSA0, this embodiment focuses on the expansion of the remaining area except for the ATDMA0. Of course, in this case, it does not matter that the user data area is expanded with the equal size by formalizing the size to be allocated at a time. Since the user data area is expanded toward the inside of the expandable area, there is no change in the size of the user data area. In addition, the ATDMA0 maintains the same size P1 because the ATDMA0 is not expanded.

Figure 7D:
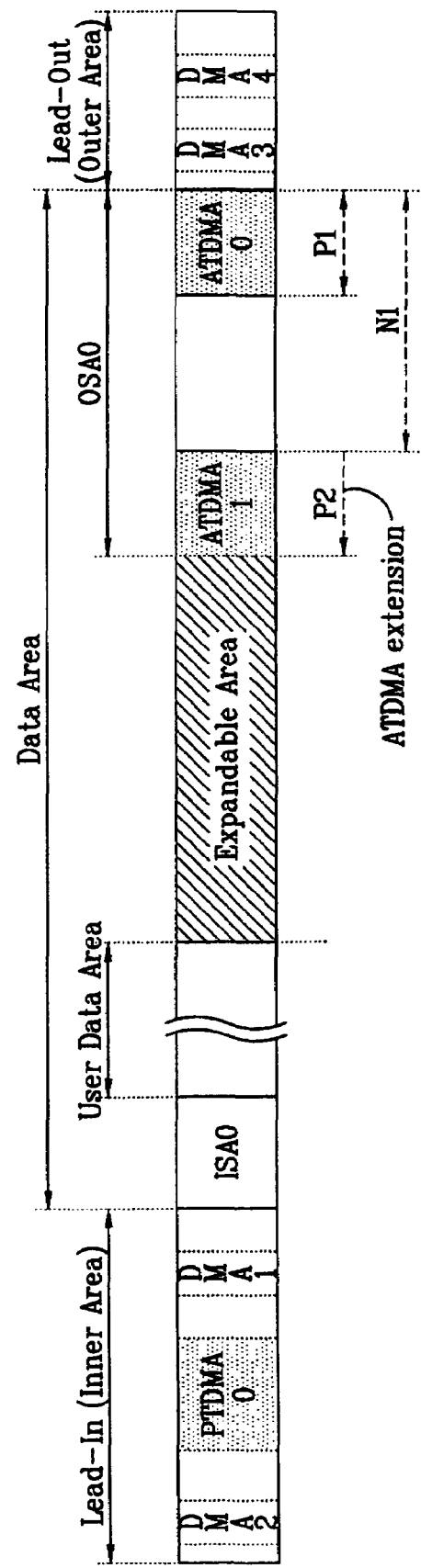

FIG. 7D illustrates a second case that the OSA0 is expanded in the initial status. Specifically, only the ATDMA allocated within the initial OSA0 is expanded toward the expandable area. Here, the expansively allocated ATDMA is named an "ATDMA1" in order to distinguish it from the initially allocated ATDMA0. A size P2 allocated to the expanded ATDMA1 can be equal to or different from the size P1 allocated to the initially allocated ATDMA0. In addition, since only the ATDMA is expanded toward the inside of the expandable area, the user data area can maintain the same size without any change.

According to the fourth embodiment of the present invention, the additional area, that is, the expandable area, is provided in advance within the disc. Therefore, if necessary, any area can be expanded using the expandable area even during use of the disc, thereby improving efficiency in the use of the disc much more.

Figure 8:
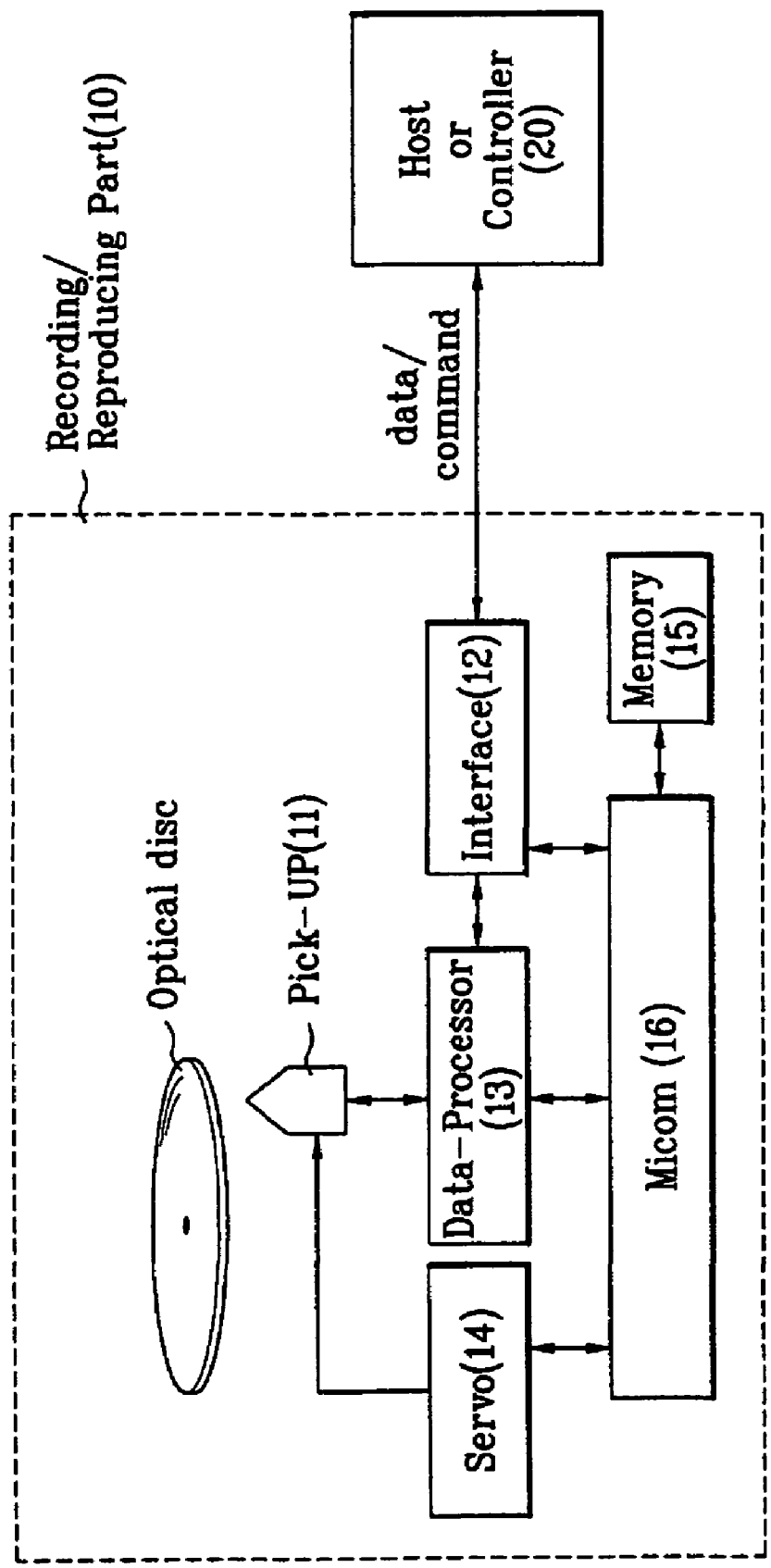
FIG. 8 illustrates a record reproducing apparatus of an inventive write-once optical disc.

FIG. 8 illustrates a recording/reproducing apparatus for the optical disc according to the present invention. The apparatus of the present invention includes a recording/reproducing part 10 for recording/reproducing information on/from the optical disc, and a control part 20 for controlling the recording/reproducing part 10. The control part 20 issues a command for recording or reproducing information on or from a specific area of the recording/reproducing part 10. Specifically, the recording/reproducing part 10 includes: an interface unit 12 for performing a communication with an exterior; a pickup unit 11 for directly recording or reproducing data on or from the optical disc; a data-processor 13 for receiving a reproduction signal from the pickup unit to restore it into desired signal value, or for modulating to-be-recorded signal into a signal to be recorded on the optical disc; a servo unit 14 for accurately reading out signal from the optical disc, or controlling the pickup unit 11 to accurately record the signal on the optical disc; a memory 15 for temporarily storing several information, including the management information, and data; and a micom 16 for controlling components of the recording/reproducing part 10.

Herein, a method for managing the spare area in the recording/reproducing apparatus according to the present invention will be described below in detail.

If the optical disc is loaded, the recording/reproducing part 10 checks the disc structure of the loaded optical disc. At this time, the recording/reproducing part 10 checks each size and location of the spare area and the ADTDMA and notifies the control part 20 of the information on the checked size and location. Then, based on the notified information, the control part 20 determines in advance whether there is the possibility of the additional expansion (or reduction).

During use of the disc, if it is necessary to expand the spare area or the ATDMA, the control part 20 transmits an expansion command, including the expansion target and its size, to the recording/reproducing part 10. In other words, a substantial execution of the expansion command means that the size and position information of each area changed by the expansion of the spare area or the ATDMA are recorded on the disc as the management information.

In other words, as shown in FIG. 4A, if the OSA0 (including the ATDMA0) is first extension-allocated, the control part 20 commands the allocation of the OSA0 ($1^{st}$ extension). Then, the recording/reproducing part 20 completes the additional allocation by recording a value of a last LSN, a size and position information of the allocated ATDMA1 on a specific area of the disc according to the allocation command. Here, the "last LSN" is an end portion of the user data area changed by the allocation.

In the same manner, if the spare area is reduction-allocated as shown in FIG. 5B, the reduced allocation is completed by recording a value of a last LSN on a specific area of the disc. Here, the "last LSN" is an end portion of the user data area changed by the reduced allocation. In FIG. 5B, since the ATDMA0 is not changed, the information on the position or size of the ATDMA0 is not changed due to the reduced allocation. Accordingly, the management information need not be recorded additionally.

As described previously, the present invention provides various methods for flexibly using spare area and/or temporary defect management area (ATDMA) if necessary in a write-once optical disc, it becomes possible to establish unified regulations on the structures of the spare area and temporary defect management area (PTDMA/ATDMA) applicable to the write-once optical disc, so that usage efficiency of the optical disc can be improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for managing a recording medium having a data area, the data area including a spare area and a user data area, sizes of the spare area and the user data area being determined at an initial status of the recording medium, the method comprising:
   determining whether an initial size of spare area is reduced, and whether an initial size of the user data area is expanded in correspondence with a reduction in the size of the spare area, during use of the recording medium; and
   recording position information on the recording medium, the position information indicating a changed position of the user data area corresponding to a determined expansion of the size of the user data area.

2. The method of claim 1, wherein the spare area includes a replacement area and a temporary defect management area, the replacement area storing data written defective area of the user data area and the temporary defect management area storing temporary defect management information.

3. The method of claim 1, wherein the position information is last LSN (logical sector number) information.

4. The method of claim 1, wherein the spare area has a maximum size at the initial status.

5. A recording medium, comprising:
   a data area including a spare area and a user data area, sizes of the spare area and the user data area being determined at an initial status of the recording medium, wherein during use of the recording medium, a size of the spare area is reduced, and a size of the user data area is expanded in correspondence with a reduction in size of the spare area; and
   a management area storing position information indicating a changed position of the user data area corresponding to a determined expansion of the size of the user data area.

6. The recording medium of claim 5, wherein the spare area includes a replacement area and a temporary defect management area, the replacement area configured to manage defective area of the user data area and the temporary defect management area configured to store temporary defect management information.

7. The recording medium of claim 5, further comprising:
   a lead-in area configured to store position information, the position information indicating a changed position of the user data area corresponding to an expansion of the size of the user data area.

8. The recording medium of claim 5, wherein the position information is last LSN (logical sector number) information.

9. An apparatus configured to manage a recording medium having a data area, comprising:
   a controller configured to
      determine sizes of a spare area and a user data area, the spare area and the user data area allocated within the data area at an initial status of recording medium,
      determine whether the initial size of spare area is reduced, and whether the initial size of the user data area is expanded, during use of the recording medium, and
      generate a control command to record position information on the recording medium, the position information indicating a changed position of the user data area corresponding to a determined expansion of the size of the user data area.

10. The apparatus of claim 9, wherein the spare area includes a replacement area and a temporary defect management area, and the controller is configured to manage the defective area of the user data using the replacement area, and record temporary defect management information in the temporary defect management area.

11. The apparatus of claim 9, further comprising:
   a pickup, operably coupled to the controller, configured to record the position information to the recording medium.

12. The apparatus of claim 11, wherein the position information is last LSN (logical sector number) information.

* * * * *